(12) United States Patent
Ochiai et al.

(10) Patent No.: US 7,192,290 B2
(45) Date of Patent: Mar. 20, 2007

(54) ROOM LAMP PROVIDED WITH INSULATING STRUCTURE BETWEEN BUS BARS THEREOF

(75) Inventors: Hiroshi Ochiai, Kawagoe (JP); Yuji Shimoda, Kawagoe (JP)

(73) Assignee: Kabushiki Kaisha T An T, Kawagoe (JP)

( * ) Notice: Subject to any disclaimer, the term of this patent is extended or adjusted under 35 U.S.C. 154(b) by 0 days.

(21) Appl. No.: 11/239,058

(22) Filed: Sep. 30, 2005

(65) Prior Publication Data

US 2007/0026729 A1 Feb. 1, 2007

(30) Foreign Application Priority Data

Jul. 28, 2005 (JP) ............................. 2005-219413

(51) Int. Cl.
*H01R 13/44* (2006.01)

(52) U.S. Cl. ...................... 439/135; 439/516; 174/68.2

(58) Field of Classification Search ........ 439/110–122, 439/135, 207–216, 516; 174/68.2, 66, 67
See application file for complete search history.

(56) References Cited

U.S. PATENT DOCUMENTS

| | | | | |
|---|---|---|---|---|
| 4,714,431 A | * | 12/1987 | McGoldrick et al. | ....... 439/212 |
| 4,820,178 A | * | 4/1989 | Anderson et al. | ........... 439/212 |
| 5,131,860 A | * | 7/1992 | Bogiel | ......................... 439/215 |
| 5,151,043 A | * | 9/1992 | Morgan | ....................... 439/212 |
| 5,162,616 A | * | 11/1992 | Swaffield et al. | .......... 174/99 B |
| 5,213,518 A | * | 5/1993 | Weidler | ....................... 439/211 |
| 5,336,849 A | * | 8/1994 | Whitney | ....................... 174/48 |
| 6,517,363 B2 | * | 2/2003 | Ross | ............................ 439/115 |
| 6,913,484 B2 | * | 7/2005 | Soga et al. | .................. 439/516 |
| 2001/0006858 A1 | * | 7/2001 | Soga et al. | .................. 439/516 |
| 2001/0006859 A1 | * | 7/2001 | Soga et al. | .................. 439/516 |
| 2001/0051459 A1 | * | 12/2001 | Soga et al. | .................. 439/516 |
| 2005/0136719 A1 | * | 6/2005 | Fontana et al. | ............. 439/212 |

FOREIGN PATENT DOCUMENTS

JP 2001-180372 7/2001
JP 2003-327043 11/2003

\* cited by examiner

*Primary Examiner*—Gary F. Paumen
(74) *Attorney, Agent, or Firm*—Nixon & Vanderhye, P.C.

(57) ABSTRACT

Switch-controlled vehicle room lamps are provided with an insulating structure between bus bars disposed on a back surface of a case Short circuiting between the bus bars is prevented by fitting insulating members molded from a relatively flexible resin into grooves in which the bus bars are fitted to cover exposed surfaces of the bus bars at least entirely over a portion where the mutual distance of the bus bars are reduced. In some embodiments, the insulating members are formed with projections which are adapted to be fit within holes of the case into which severed bridge portions of the bus bar extend. The projections may advantageously be provided with an acute-angled distal end and a constriction at a midsection thereof.

9 Claims, 6 Drawing Sheets

ROOM LAMP PROVIDED WITH INSULATING STRUCTURE BETWEEN BUS BARS THEREOF

BACKGROUND OF THE INVENTION

1. Field of the Invention

The present invention relates to a vehicle room lamp to be mounted to an inner lining of a vehicle roof and, more specifically, to an insulating structure between bus bars for a vehicle room lamp which prevents bus bars disposed on a back surface of a case of the room lamp from being short-circuited due to carbon fibers contained in the inner lining when being mounted to a hole of the inner lining of the roof.

2. Description of the Related Art

A general structure of a vehicle room lamp is disclosed, for example, in Japanese Unexamined Patent Application Publication No. 2001-180372. This invention has a structure in which grooves are formed on a back surface of a case, bus bars are fitted in the grooves for connecting a female connector to be connected with a male connector extending from a power source with a light bulb and a switch, so that flashing of the light bulb is executed by turning the switch on and off.

In the vehicle room lamp in this structure, since fitting of the bus bars into the grooves can be performed automatically, there is an advantage in that manufacture in low cost is achieved. However, since the bus bars are exposed on the surface, there is a problem such that when it is fitted and fixed to the inner lining on the roof of the vehicle, carbon fibers contained in the inner lining, although they are short, fall between the bus bars disposed close to each other, and causes short circuit between the bus bars, which may result in blowout of a fuse.

Therefore, a case which can prevent the above-described short circuit between the bus bars was developed. This invention is disclosed in Japanese Unexamined Patent Application Publication No. 2003-327043, and configured by integrating respective bus bars which constitute a circuit via bridge portions, setting the entire bus bar into an injection molding machine for manufacturing the case by injection molding for molding the bus bar within the case, and then cutting and bending the bridge upward for establishing a circuit for controlling flashing of a light bulb.

In this invention, in order to prevent metal chips generated when mounting the case to the vehicle with a screw from entering into hole portions formed when cutting and bending upward the bridge portions to cause the short circuit, cap members for closing the holes are integrally formed when molding the case, and the cap members are fitted into the holes in the last step.

In the above-described vehicle room lamp with the bus bar molded therein, since a very difficult work to insert the bus bars at the time of injection molding is involved, there arises a problem of increase in manufacturing cost, and since it also requires a manual operation to fit the cap member formed integrally with the case into the respective holes so as to prevent the short circuit due to the metal chips, there arises a problem of increase in cost of the product as a whole.

SUMMARY OF THE INVENTION

In order to solve the above-described problems, it is an object of the invention to provide an insulating structure between bus bars in a vehicle room lamp in which a bus bar portion where exposed bus bars are close to each other is covered entirely by an insulating member, and hence short circuit can be prevented even when conductive members such as carbon fibers coming off an inner lining of a roof of a vehicle are attached to the vehicle room lamp.

In order to achieve the above-described object, a first aspect of the invention is, in a vehicle room lamp including a number of bus bars disposed on a back surface of a case provided with a switch for controlling an illumination lamp such as a light bulb or flashing of the light bulb, an insulating structure between the bus bars in a vehicle room lamp characterized in that short circuit between the bus bars is prevented by fitting insulating members molded by relatively flexible resin into grooves in which the bus bars are fitted to cover exposed surfaces of the bus bars at least entirely over a portion where the mutual distance of the bus bars is reduced.

In the structure of the first aspect, preferably, the insulating members are formed into substantially the same width as the grooves, and the resilient members are resiliently engaged with the grooves.

A second aspect of the invention is, in a vehicle room lamp including a number of bus bars disposed on a back surface of a case provided with a switch for controlling an illumination lamp such as a light bulb or flashing of the light bulb, the bus bars for achieving flashing of the illumination lamp being integrated via bridge portions, the bus bars being electrically separated by cutting and bending upward the bridge portions at positions of holes formed on the case at positions corresponding to the bridge portions in a state of being fitted into the grooves formed on the case, characterized in that short circuit between the bus bars is prevented by fitting insulating members molded by relatively flexible resin into grooves in which the bus bars are fitted and fitting projections projecting from the insulating members into the holes formed on the grooves to cover exposed surfaces of the bus bars at least entirely over a portion where the mutual distance of the bus bars is reduced.

In the second aspect of the invention, preferably, the projection of the insulating member includes an acute-angled distal end and a constriction at a midsection thereof, so that the insulating member is prevented from coming off by engagement of the constriction with a distal end of the cut and bent upward bus bar.

As described above, in the invention, since the insulating members molded by relatively flexible resin is fitted into the grooves in which the bus bars are fitted to cover the exposed surfaces of the bus bars entirely over a portion where the mutual distance of the bus bars are reduced, the bus bars are prevented from electrically short-circuited even when the metal chips such as carbon fibers fall onto the back surface side of the case from the inner lining when being mounted to the vehicle and the short circuit can be prevented over a large area by the single insulating member, whereby improvement of workability is achieved.

Since the insulating member is formed into substantially the same width as the groove, the insulating members can be fixed by being inserted into the grooves, whereby a very simple fitting operation is achieved.

Furthermore, since the projections to be fitted into the holes for separating the bus bars integrally, when the projections are inserted, the projections come into abutment with the cut and bent upward distal ends of the bus bars and are engaged therewith by a frictional force, so that the insulating member is prevented from being coming off easily.

Since the projection of the insulating member includes the acute-angled distal end and the constriction at the midsection thereof, insertion into the portion where the bus bar 4 is cut and bent upward is facilitated. Also, fixation of the insulating member 8 is ensured by engagement between the constriction at the midsection with the cut and bent upward distal end of the bus bar 4 in the inserted state, whereby such effect that fixture can further be enhanced is achieved.

DESCRIPTION OF THE PREFERRED EMBODIMENTS

Figure 1:
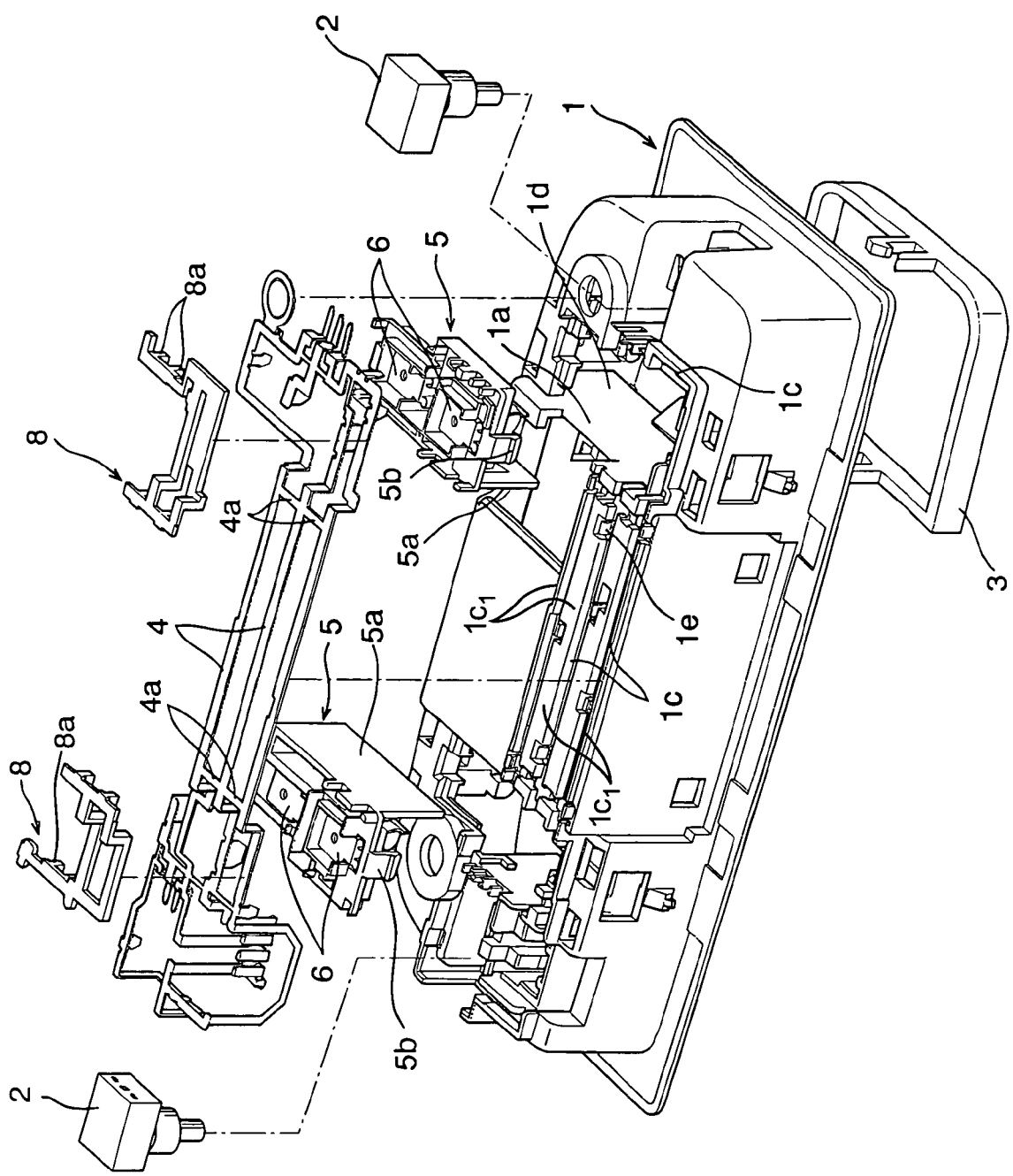
FIG. 1 is a general exploded perspective view of a thermal insulation structure of a vehicle illumination lamp according to the invention viewed from the back surface side of a case.
Figure 2:
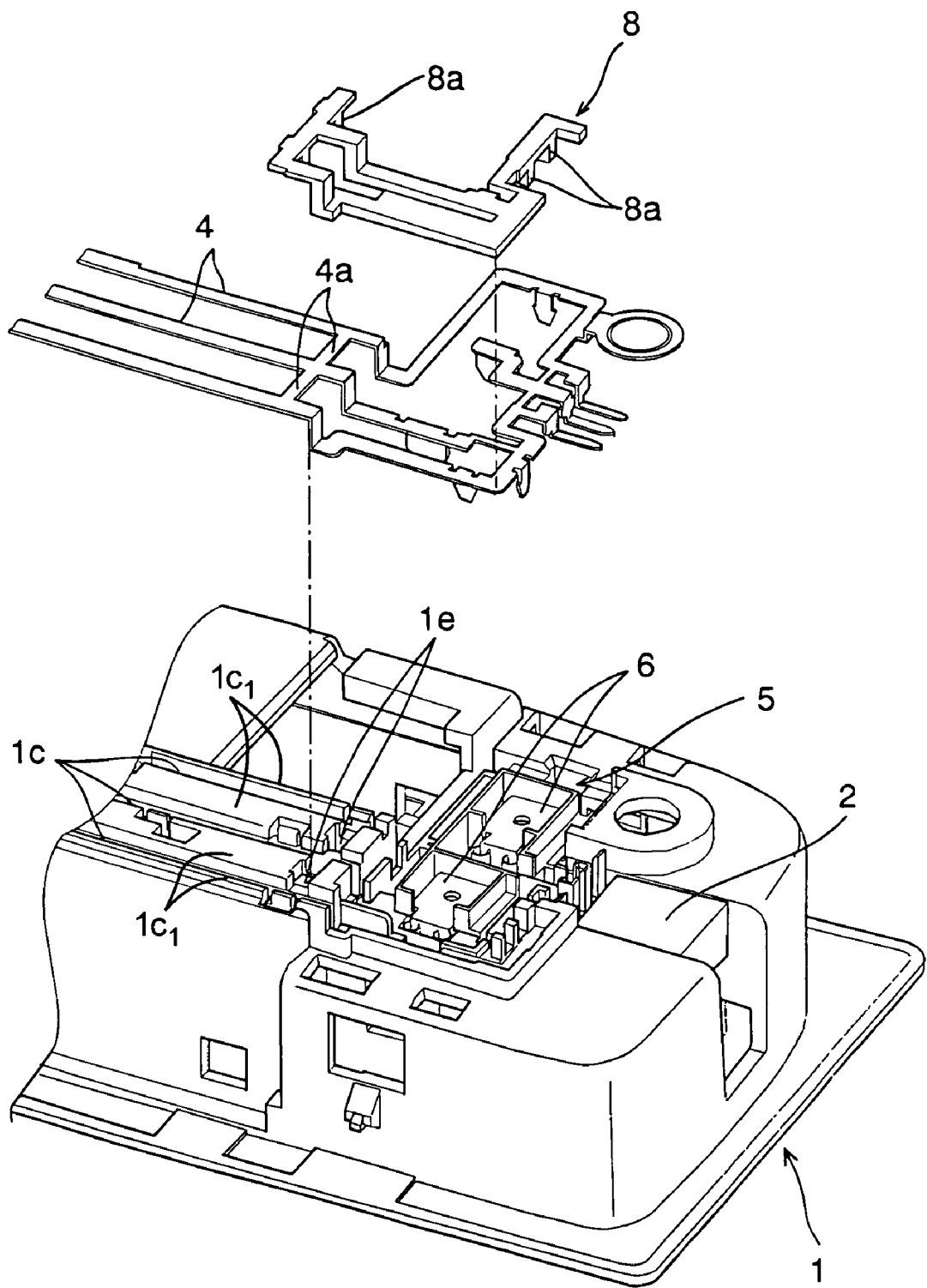
FIG. 2 is an exploded perspective view showing part of the structure shown in FIG. 1 in an enlarged scale.
Figure 3:
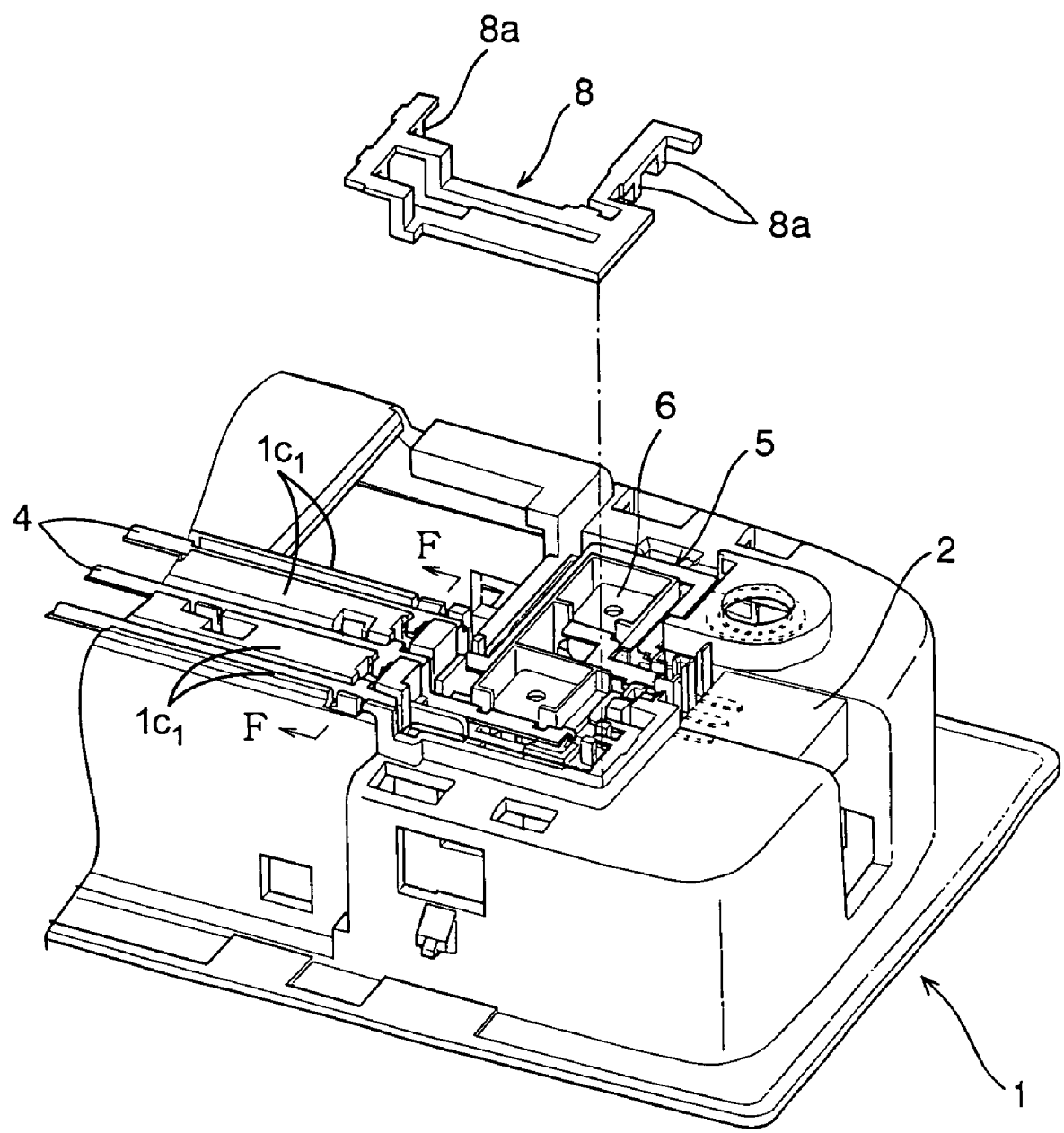
FIG. 3 is a perspective view of the structure in FIG. 1 in a state in which bus bars are mounted to the case.
Figure 4:
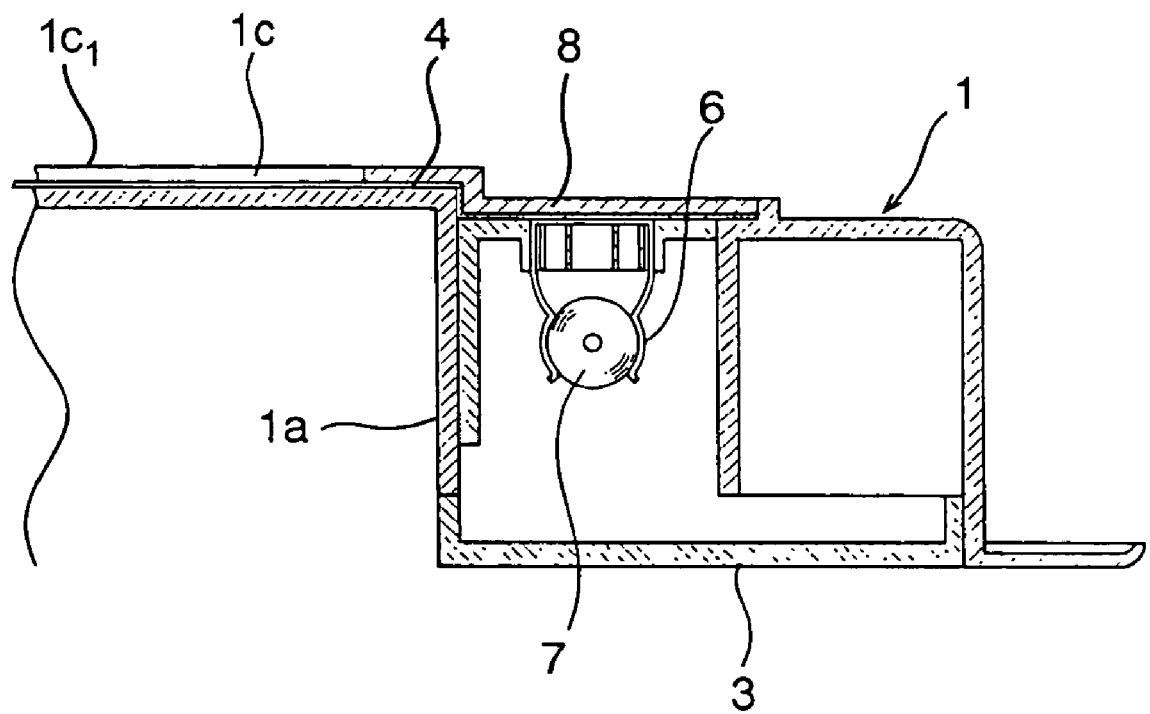
FIG. 4 is a cross-sectional view of a portion where the bulb cassette in an assembled state is mounted.

The present invention is a structure in which at least a portion of bus bars where the mutual distances are reduced is entirely covered by fitting an insulating member molded by relatively flexible resin into grooves in which the bus bars are fitted to cover exposed surfaces of the bus bars.

EXAMPLE 1

Referring now to drawings, an embodiment of a thermal insulation structure of a vehicle room lamp according to the present invention will be described.

Reference numeral 1 is a case formed of resin whose material cost is low, such as polypropylene and partitioned into three chambers by two partitioning wall surfaces 1*a*. The two chambers on the left and right sides are chambers for storing map lamps, and a center chamber is a chamber for storing an illuminating unit for illuminating a portion of a cup holder provided between a driver's seat or a front passenger's seat, or a speaker or a microphone for a mobile phone.

Push switches 2 are mounted to a bottom plate of the left and right chambers respectively, and a lens 3 for turning the push switches on and off are rotatably mounted on the front side (the lower side in the drawing). A connector 1*b* to be connected with a battery of a vehicle is mounted on the bottom plate of the case 1. Grooves 1*c* are defined between case walls 1*c*$_1$ for receiving therein bus bars 4 so as to connect the connector 1*b* with the push switch 2. A terminal strip 6 is provided for clamping and holding an electrode portion of a light bulb 7 described later.

The bottom plate which constitutes the map lamp chambers in the case 1 is formed with openings 1*d* for detachably attaching bulb cassettes 5. The bulb cassette 5 is formed of thermal resistant resin, for example, of expensive nylon resin, so that the terminal strip 6 is detachably attached thereto. The bulb cassette 5 is formed integrally with a heat shield wall 5*a* so as to extend along the wall surface 1*a* in a state of being mounted to the opening 1*d* using a claw 5*b*. The heat shield wall 5*a* is not necessarily required to be formed integrally with the bulb cassette 5, and may be integrated by means such as adhesion.

In this manner, even when the light bulb 7 is mounted to the terminal strip 6 provided in the bulb cassette 5, the bulb cassette 5 is mounted to the opening 1*d* of the case 1, power is supplied to the light bulb 7 to illuminate the same, heat from the light bulb 7 is increased, and the heat shield wall 5*a* formed of heat resistant resin is heated, the heat shield wall 5*a* is prevented from being thermally deformed, and hence high heat is not transmitted to the wall surface 1*a* owing to the heat shield wall 5*a*. Therefore, the wall surface 1*a* is prevented from being thermally deformed.

The bus bars 4*a* for connecting the connector 1*b* with the push switch 2 and the terminal strip 6 are integrated by bridges 4*a* at the time of manufacture. The bus bars 4*a* are formed into a structure which enable them to be fit into the grooves 1*c* of the case 1. Subsequent to being fit into the groves 1*c*, the bus bars 4*a* may then be cut and bent upwardly so as to separate at positions of holes 1*e* formed at positions corresponding to the bridges 4*a*. In such a manner, each bus bar 4 establishes an independent circuit. (See for example, JP-A-2001-180372).

Reference numeral 8 designates an insulating member formed of flexible resin for covering portions where the bus bars are arranged close to each other. The insulating member 8 is formed with a plurality of projections 8*a* to be fitted into the holes 1*e* of the case 1. The bus bars 4 are first fitted to the grooves 1*c* and, in the separated state by being cut and bent upward in the holes 1*e*, the insulating members 8 are fitted into the grooves 1*c*, and then the projections 8*a* are fitted and fixed to the holes 1*e*, whereby the upper surfaces of the bus bars 4 which are close to each other are covered.

Therefore, even though carbon fibers (several millimeters in length, generally) contained in the inner lining fall on the bottom surface side of the case 1 when the case is mounted into a hole formed on an inner lining of the vehicle, since the upper surfaces of the bus bars whose mutual distance is reduced are covered by the insulating members 8, the bus bars are prevented from being short-circuited.

Figure 6:
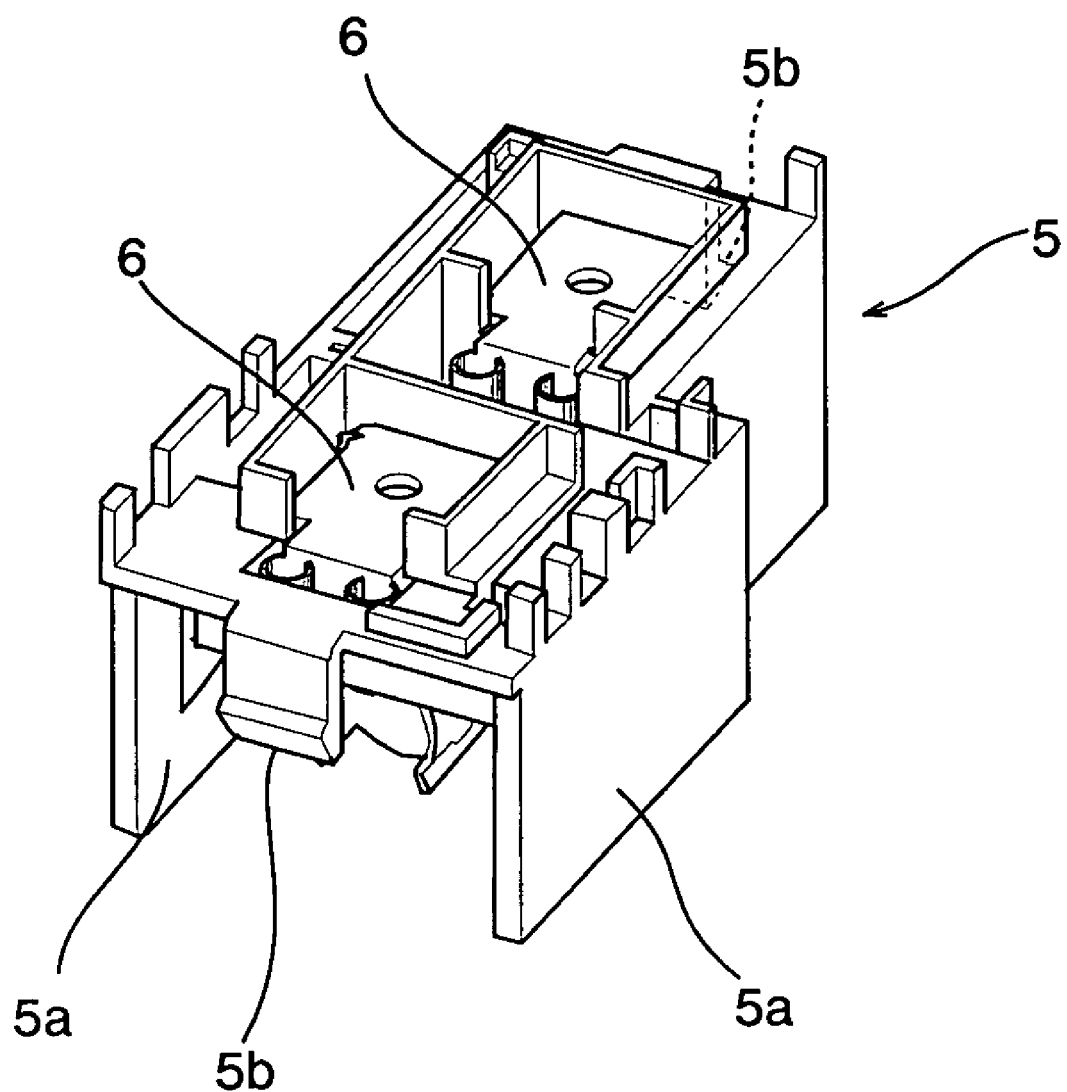
FIG. 6 is a perspective view of another embodiment of the bulb cassette.

Although the structure in which the single heat shield wall 5*a* is formed in the bulb cassette 5 for preventing thermal deformation of the single wall surface 1*a* in the embodiment described above, it is also possible to form two of the heat shield wall 5*a* as shown in FIG. 6 to prevent thermal deformation of the two wall surfaces opposed to each other with the intermediary of the light bulb 7.

Figure 5A:
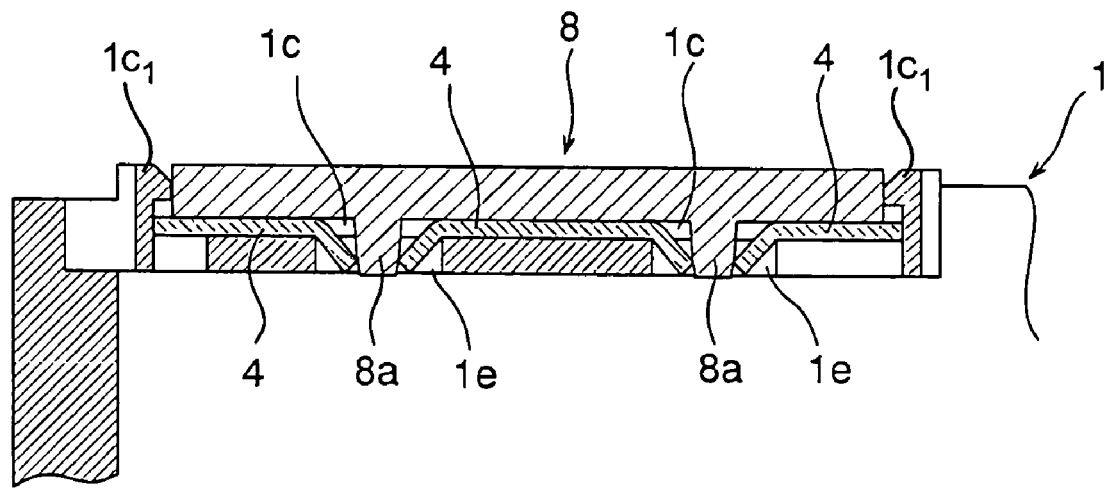
FIG. 5A is a cross-sectional view taken along the line F—F in FIG. 3 in a state in which an insulating member is fitted into a groove.
Figure 5B:
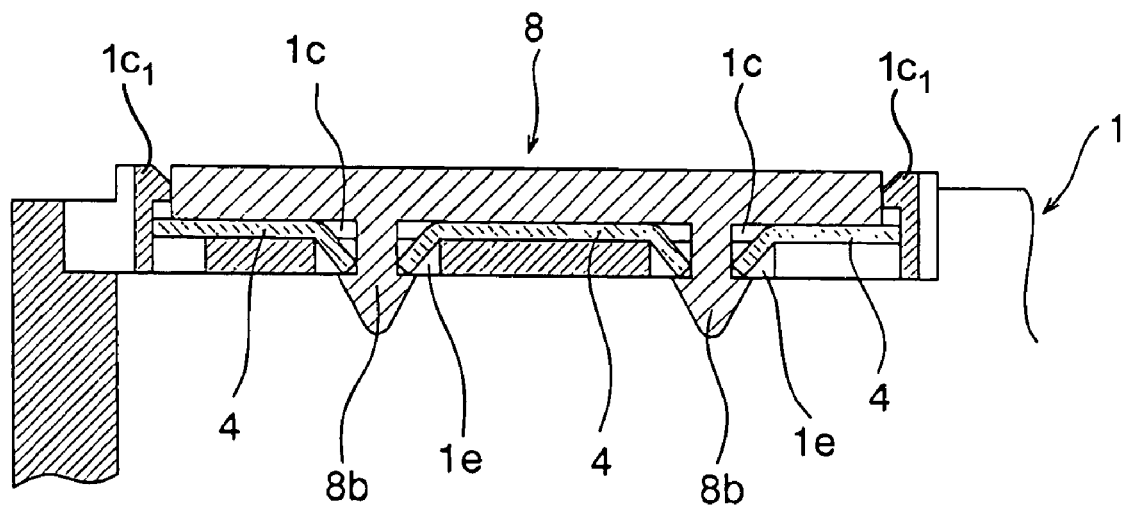
FIG. 5B is a cross-sectional view showing a case in which the shape of the projection of the insulating member is different.

The projection 8*a* formed on the insulating member 8 is not necessarily required to be a rod-shape as shown in FIG. 5A, but may be a projection 8*b* formed to have an acute-angled distal end and a constriction at a midsection thereof. With the projection 8*b* in this structure, since the distal end is acute-angled, insertion into the portion where the bus bars 4 are cut and bent upward is facilitated and, in the inserted state, since the constriction at the midsection thereof is engaged with the cut and bent upward distal end of the bus bar 4, fixation of the insulating member 8 is ensured, and hence the securement of the insulating member 8 is further enhanced.

What is claimed is:

1. In a vehicle room lamp comprising a number of bus bars disposed on a back surface of a case provided with a switch for controlling an illumination lamp such as a light bulb or flashing of the light bulb, the bus bars for achieving flashing of the illumination lamp being integrated via bridge portions, the bus bars being electrically separated by cutting and bending upward the bridge portions at positions of holes formed on the case at positions corresponding to the bridge portions in a state of being fitted into the grooves formed on the case, wherein short circuit between the bus bars is prevented by fitting insulating members molded by relatively flexible resin into grooves in which the bus bars are fitted and fitting projections projecting from the insulating members into the holes formed on the grooves to cover exposed surfaces of the bus bars at least entirely over a portion where the mutual distance of the bus bars is reduced.

2. The insulating structure between the bus bars in a vehicle room lamp according to claim 1, wherein the projection of the insulating member comprises an acute-angled distal end and a constriction at a midsection thereof, so that the insulating member is prevented from coming off by engagement of the constriction with a distal end of the cut and bent upward bus bar.

3. A vehicle room lamp comprising:
   a case having case walls defining therebetween a plurality of grooves and establishing a space for retaining an illumination lamp therein;
   a plurality of bus bars operably connected to the illumination lamp so as to supply electrical power thereto, wherein each of the bus bars is positioned in a respective one of the grooves; and
   an insulating structure to prevent short-circuiting between the bus bars, the insulating structure including insulating members formed of a relatively flexible resin, the insulating members being resiliently fitted within each of the grooves between the case walls so as to be in covering contact with the bus bar positioned therein.

4. The vehicle room lamp as in claim 3, wherein the bus bars include at least one severed bridge, and the case includes at least one hole for receiving portions of the at least one severed bridge therein, and wherein the insulating member includes at least one projection which extends into the at least one hole between the portions of the at least one severed bridge therein.

5. The vehicle room lamp as in claim 4, wherein the at least one projection includes an angled distal end.

6. The vehicle room lamp as in claim 5, wherein the at least one projection includes a constriction at a midsection thereof.

7. The vehicle room lamp as in claim 3, wherein the bus bars include a plurality of severed bridges, and the case includes a plurality of holes for receiving respective portions of the severed bridges therein, and wherein the insulating member includes projections, each projection extending into a respective one of the holes between the respective portions of the severed bridges therein.

8. The vehicle room lamp as in claim 7, wherein each of the projections includes an angled distal end.

9. The vehicle room lamp as in claim 8, wherein each of the projections includes a constriction at a midsection thereof.

* * * * *